(No Model.)
H. W. WINTER.
ROTARY CUTTER.
No. 503,067. Patented Aug. 8, 1893.
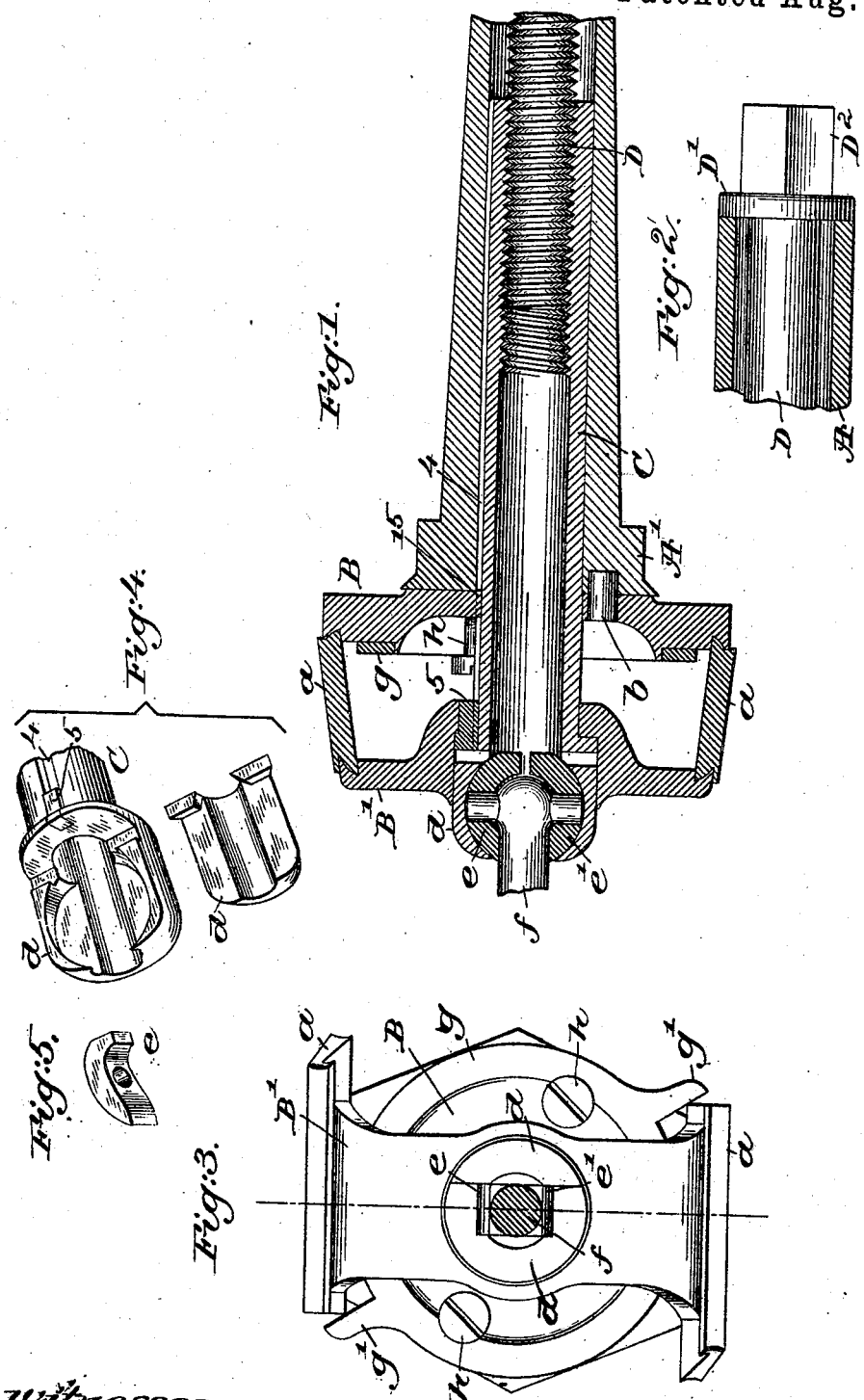
Witnesses.
Fred S. Greenleaf
Louis N. Gowell
Inventor
Henry W. Winter
By Crosby & Gregory
Attys.

UNITED STATES PATENT OFFICE.

HENRY W. WINTER, OF BOSTON, ASSIGNOR TO JAMES W. BROOKS, TRUSTEE, OF PETERSHAM, MASSACHUSETTS.

ROTARY CUTTER.

SPECIFICATION forming part of Letters Patent No. 503,067, dated August 8, 1893.

Application filed March 13, 1893. Serial No. 465,762. (No model.)

*To all whom it may concern:*

Be it known that I, HENRY W. WINTER, of Boston, county of Suffolk, State of Massachusetts, have invented an Improvement in Rotary Cutters, of which the following description, in connection with the accompanying drawings, is a specification, like letters and figures on the drawings representing like parts.

This invention has for its object to improve the construction of rotary cutters for leather cutting machines.

In my invention I provide a hollow shaft against one end of which bears one of the heads or plates of the cutter, the other head or plate receiving through it a clamping bar, preferably hollow and provided internally at its inner end with a screw-thread into which is turned a screw inserted from the opposite end of the hollow shaft, said screw in its rotation into the bar causing the two heads of the cutter to clamp the blades between them, and also cause the inner head to be locked to the said sleeve.

Figure 1, in longitudinal section, shows the principal part of a rotary cutter, and the devices with which it is connected in use. Fig. 2 shows part of the end of the sleeve and the screw broken off from the right of Fig. 2; Fig. 3 a, left-hand end elevation of the cutter shown in Fig. 1; Fig. 4, a detail of the outer end of the clamping bar; and Fig. 5, a detail of one of the concavo-convex shells or blocks.

The sleeve A has at one end a flange or enlargement A', against which bears the rear side of the inner head B of the cutter, the outer head being marked B', they being grooved at their inner sides to receive the blades $a$, $a$, the blades shown having grooves to receive lips at the ends of the heads or plates, as best shown in Fig. 1. There is a locking device between the inner head and the flange or enlargement A', it, as shown, being a pin or projection $b$ on one entering a hole in the other. The outer head B' is chambered at its center to receive the head of a clamping bar C, preferably hollow and provided with an internal thread which is engaged by a screw D having a collar D' to abut against the end of the sleeve A, the screw having a suitable wrench head $D^2$, the rotation of the screw to turn it into the bar drawing all the parts firmly together. The bar C is provided with a groove 4, in the outer end of which is secured a key 5, it entering a notch or key-seat in the cylindrical opening at the central part of the outer head B', thus keying said head upon the bar. The inner head B at its central opening is provided with a key 15 which also enters the groove 4, thus fixing the inner head upon the bar. It will thus be understood that both heads are dogged or keyed to the bar, and that the inner head is connected with the sleeve by a locking device, thus restraining all tendency to independent rotation of any of the named devices. The head of the bar referred to is made in two parts, $d$, $d'$, see Fig. 4, made spherical at their inner sides, which receive two concavo-convex shells $e$, $e'$, which latter receive the T-headed inner end of a shaft $f$ corresponding with the shaft $f$ used in United States Patent No. 410,089, dated August 27, 1889, it being used to rotate a rand cutter as provided for in said patent.

To adjust the blades simultaneously, the cutter is provided with an adjusting device $g$, having horns $g'$, $g'$, which act against the inner ends of the blades, the adjusting device being locked in position by suitable screws $h$, $h$.

Having described my invention, what I claim as new, and desire to secure by Letters Patent, is—

1. The hollow sleeve-like spindle for the cutter-head; the internally threaded clamping-bar C; and blade holding heads through which the said bar is extended; combined with longitudinally adjustable blades held between said heads; and a screw extended longitudinally into the rear end of said sleeve and into said bar, to operate, substantially as described.

2. The hollow sleeve, the internally threaded clamping bar and blade or cutter holding heads through which the bar is extended, combined with blades or cutters located between said heads, and a screw extended longitudinally into the said sleeve from one end and into said bar, and a locking device between the end of the sleeve and the inner head of the rotary cutter, substantially as described.

3. In a rotary cutter, the blade holding heads, and cutter blades, combined with a clamping bar located at the center of motion of the said heads, the said bar having a two-part head which is kept closed by its entrance into a socket in the outer side of the outer cutter head, substantially as described.

4. In a rotary cutter, the blade holding heads, the cutter blades located between them, a clamping bar located at the center of motion of said heads, the said bar having a two-part head which is kept closed by its entrance into a socket in the outer side of the outer cutter-head, combined with a two-part concavo-convex bushing, and with a T-shaped rod or shaft embraced thereby, substantially as described.

5. The hollow sleeve, the inner head of the cutter having a notch in its central opening, the clamping bar provided with a key to enter said notch, and devices to hold the clamping bar in the sleeve, combined with cutter blades and with a locking device between the head and sleeve, substantially as described.

In testimony whereof I have signed my name to this specification in the presence of two subscribing witnesses.

HENRY W. WINTER.

Witnesses:
FRANK CHAS,
GEO. W. HAMMATT.